Sept. 19, 1939.   F. C. FRANK   2,173,584
WHEEL
Original Filed Dec. 21, 1931
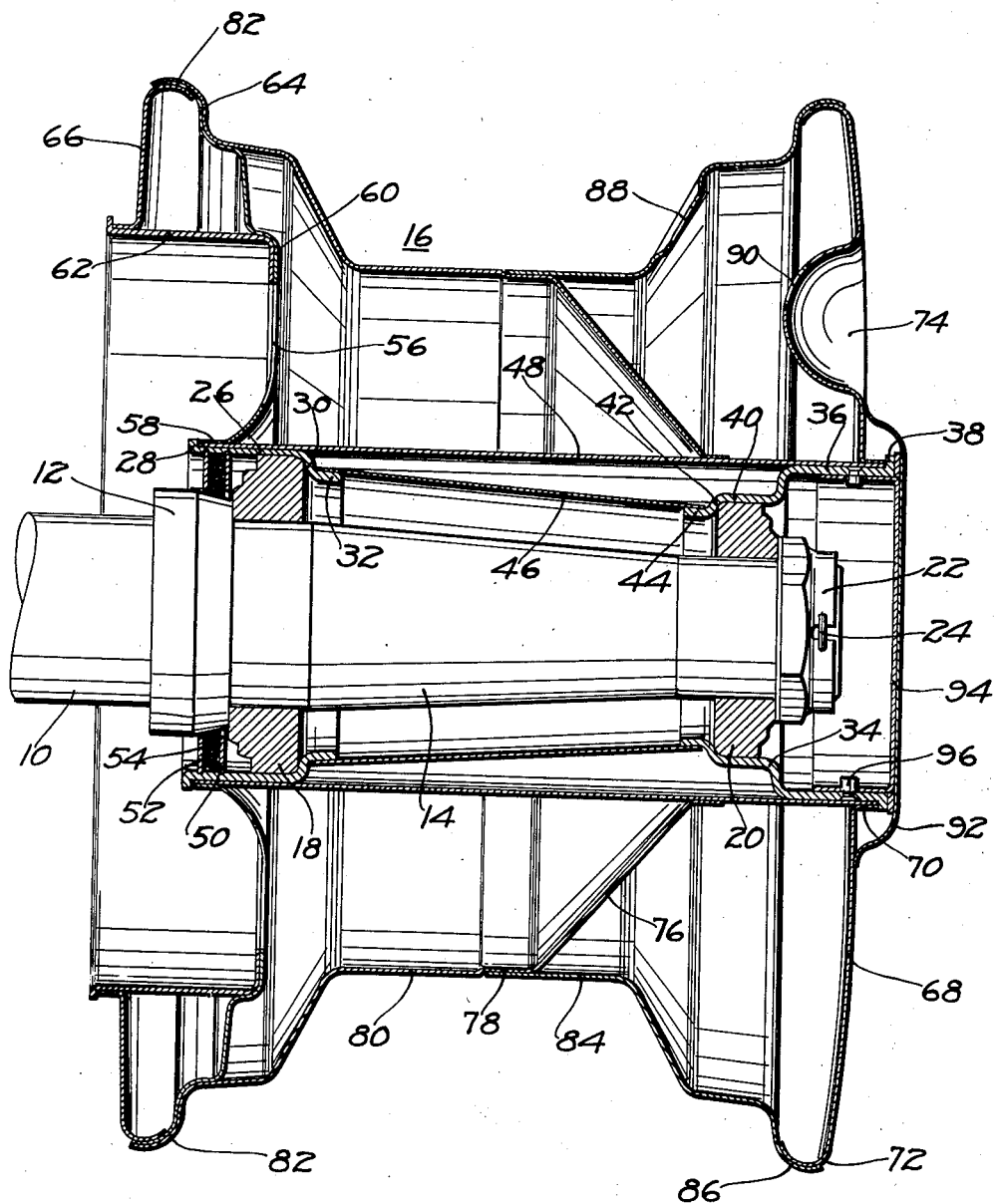
INVENTOR.
FREDERICK C. FRANK
BY O. H. Fowler
ATTORNEY Patented Sept. 19, 1939

2,173,584

UNITED STATES PATENT OFFICE 2,173,584

WHEEL

Frederick C. Frank, South Bend, Ind., assignor to Bendix Aviation Corporation, South Bend, Ind., a corporation of Delaware Application December 21, 1931, Serial No. 582,449
Renewed January 12, 1937

4 Claims. (Cl. 301—6)

This invention relates to wheels, and more particularly to wheels for airplanes.

Broadly, the invention comprehends an extremely light yet durable wheel made entirely of stampings from asthenic steel high in chromium and nickel content, so that it may resist corrosive action due to atmospheric changes. The various component parts of the wheel are secured together by electrical resistance welding.

An object of the invention is to provide a wheel composed entirely of steel stampings.

Another object of the invention is to provide a wheel composed entirely of steel stampings welded together to provide a substantial structure.

A further object of the invention is to provide a wheel composed entirely of steel stampings including a hub, radial load-carrying disks, a braking flange, a rim and a member for bracing the radial load-carrying disks against end loads.

Another object of the invention is to provide a wheel of the character described in which the amount of required machined operations on the various parts during manufacture are materially reduced.

Other objects of the invention will appear from the following description taken in connection with the drawing forming a part of this specification.

The drawing is a comprehensive view representing a vertical section of a wheel embodying the invention.

Referring to the drawing for more specific details of the invention, 10 represents an axle having a shoulder 12 and a spindle 14. A wheel shown generally at 16 is supported for rotation on the spindle by suitable bearings 18 and 20. The wheel is retained in position by a nut 22 threaded on the end of the spindle, the nut being locked against displacement by the conventional cotter pin 24.

The hub of the wheel comprises a bearing cup 26 including a cylindrical section having an external flange 28 and an internal shoulder 30 and a concentric portion 32. The shoulder 30 engages and retains the bearing 18 against the shoulder 12 on the axle. A somewhat similar bearing cup 34 is arranged in reversed position. This bearing cup comprises a cylindrical section 36 of the same diameter as the cup bearing 26, an external flange 38, a concentric section 40 having a shoulder 42 embracing and retaining the bearing 20, and a concentric section 44. The concentric section 32 on the bearing cup 26 is connected to the concentric section 44 on the bearing cup 36 by a conical section 46, the ends of which are electrically welded to the sections 32 and 44, respectively, and the cup bearings 26 and 36 are further connected by a cylindrical section 48, the ends of which abut the flanges 28 and 38 and are electrically welded thereto. The bearing cup 26 has secured in its cylindrical portion spaced rings 50 and 52 between which is positioned a felt retaining washer 54.

A radial load-carrying disk 56 has a flange or sleeve 58 embracing the cylinder 48 and abutting the flange 28 on the bearing cup 26 where it is electrically welded. The disk is offset, as indicated at 60, for the reception of a braking flange 62, and is flanged as at 64 to support a rim to be hereinafter described. The braking flange 62 and the flange 64 are secured together by a ring 66 welded to the braking flange 62 and the flange 64.

A radial load-carrying disk 68 has a sleeve 70 embracing the cylinder 48 and abutting the flange 38 on the bearing cup 36 where it is electrically welded. This disk has an inturned flange 72 for supporting the rim and a recess or depression 74, the purpose of which will hereinafter appear.

The rim comprises two parts, one including a conical section 76 electrically welded to the cylinder 48 and extending rearwardly approximately to the center of the rim where it converges into a short cylindrical section 78 forming a shoulder on a cylindrical section 80 providing approximately one-half of the drop center of the rim, and the cylindrical section has a flange 82 lapped against the flange 64 on the radial load-carrying disk 56 to provide a suitable reinforced retaining flange.

The other part of the rim includes a cylindrical section 84 fitted on the shoulder 78. This section has a flange 86 lapped against the flange 72, the joints between the sections 78 and 84 and the sections 72 and 86 being welded together. The rim portion 86 has an opening 88 registering with an opening 90 in the depression 74 for the reception of a valve stem, not shown.

A hub cap of any suitable type may be secured on the front end of the hub. As shown, a disk 92 is suitably secured to a shell 94 fitted in the hub and secured in place by the conventional bayonet joint 96, or other suitable securing means.

While the preferred embodiment of the invention has been shown and described, it is to be understood that this is given merely as an example of the underlying principle of the invention, and since this principle may be incorporated in other specific mechanical structures, I do not intend to be limited to that shown except as such limitations are clearly imposed by the appended claims.

Having thus described the various features of the invention, what I claim as new and desire to secure by Letters Patent is:

1. A wheel comprising a radial load-carrying disk, an offset portion arranged concentric therein, a braking flange secured in the offset portion, a flange on the disk and a ring connecting the flange to the braking flange.

2. A wheel comprising a hub, radial load-carrying disks secured thereto, a rim secured to the radial load-carrying disks including two stampings having tire bead supporting cylindrical portions and flanges, conical portions, and reduced diameter cylindrical portions integral therewith, one of the last mentioned cylindrical portions sleeved within the other and having a conical portion integral therewith extending to and connected with the hub.

3. A wheel comprising a hub, a radial load-carrying disc on one end of said hub having an inturned flange, a radial load-carrying disc on the other end of said hub having an outturned flange, a rim having a tire bead flange along each edge and overlapped and secured to said first named disc and extending parallel and adjacent to and secured to the second named outturned flange, a drum secured to said second named disc, and an annular radial disc brace member having an inturned flange connected to said drum and overlapped with and secured to the flange of said second named disc and the adjacent rim flange.

4. A wheel comprising a hub, a radial load-carrying disc on one end of said hub having an inturned flange, a radial load-carrying disc on the other end of said hub having an outturned flange, a rim having a tire bead flange along each edge and overlapped and secured to said first named disc and extending parallel and adjacent to and secured to the second named outturned flange, a drum secured to said second named disc, and an annular radial disc brace member having an inturned flange connected to said drum and overlapped with and secured to the flange of said second named disc and the adjacent rim flange, said rim member being formed of two parts telescoped together at a central point, the inner part having a conical portion extending to and secured to the hub.

FREDERICK C. FRANK.